US010698862B2

(12) United States Patent
Eda et al.

(10) Patent No.: US 10,698,862 B2
(45) Date of Patent: Jun. 30, 2020

(54) ENHANCED SNAPSHOT PERFORMANCE, STORAGE EFFICIENCY IMPROVEMENT, DYNAMIC SNAPSHOT POLICY IN ERASURE CODE SUPPORTED OBJECT STORAGE ENVIRONMENT

(71) Applicant: International Business Machines Corporation, Armonk, NY (US)

(72) Inventors: Sasikanth Eda, Pune (IN); Sandeep R. Patil, Pune (IN); Sachin C. Punadikar, Pune (IN); Sanjay K. Sudam, Pune (IN)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 15/486,519

(22) Filed: Apr. 13, 2017

(65) Prior Publication Data

US 2018/0300346 A1    Oct. 18, 2018

(51) Int. Cl.
*G06F 16/00* (2019.01)
*G06F 16/11* (2019.01)

(52) U.S. Cl.
CPC ........ *G06F 16/128* (2019.01); *G06F 2201/84* (2013.01)

(58) Field of Classification Search
CPC ..... G06F 16/128; G06F 2201/84; G06F 16/27
See application file for complete search history.

(56) References Cited

U.S. PATENT DOCUMENTS

| 8,352,431 B1 | 1/2013 | Protopopov et al. | |
|---|---|---|---|
| 8,352,501 B2 | 1/2013 | Baptist et al. | |
| 10,423,503 B2* | 9/2019 | Juniwal | G06F 3/067 |
| 2009/0158367 A1* | 6/2009 | Myers | G06F 9/54 725/109 |
| 2010/0100587 A1* | 4/2010 | Teglovic | G06F 11/1464 709/203 |
| 2011/0004494 A1* | 1/2011 | Denny, Jr. | G06F 19/328 705/4 |
| 2011/0029840 A1* | 2/2011 | Ozzie | G06F 11/1004 714/763 |

(Continued)

OTHER PUBLICATIONS

"Erasure Code Support", OpenStack Foundation, http://docs.openstack.org/developer/swift/overview_erasure_code.html, swift 2.12.1.dev107 documentation, retrieved from the internet Feb. 20, 2017, 11 pages.

(Continued)

*Primary Examiner* — Noosha Arjomandi
(74) *Attorney, Agent, or Firm* — Stephen R. Tkacs; Stephen J. Walder, Jr.; Robert M. Sullivan

(57) ABSTRACT

A mechanism is provided in a data processing system comprising at least one processor and at least one memory, the at least one memory comprising instructions which are executed by the at least one processor and configure the processor to implement a snapshot utility for generating a snapshot of an erasure coded object in an object storage environment. Responsive to receiving a request to generate a snapshot of an erasure coded (EC) object in a filesystem in the object storage environment, the snapshot utility obtains a list of EC fragments from a proxy layer of the object storage environment. The snapshot utility copies a number of the EC fragments to generate the snapshot of the EC object.

20 Claims, 10 Drawing Sheets

(56) References Cited

U.S. PATENT DOCUMENTS

| | | |
|---|---|---|
| 2012/0060072 A1* | 3/2012 | Simitci ............... H03M 13/373 |
| | | 714/756 |
| 2014/0337685 A1 | 11/2014 | Baptist et al. |
| 2015/0286701 A1* | 10/2015 | Wideman .............. G06F 16/285 |
| | | 707/737 |
| 2016/0139981 A1* | 5/2016 | Chennamsetty .... G06F 11/1008 |
| | | 714/773 |
| 2017/0185330 A1* | 6/2017 | Danilov ................ G06F 3/0619 |
| 2017/0228285 A1* | 8/2017 | Merritt ................ G06F 11/1076 |
| 2017/0288701 A1* | 10/2017 | Slik ................... H03M 13/3761 |
| 2017/0329552 A1* | 11/2017 | Baldwin .............. G06F 3/0685 |
| 2017/0337097 A1* | 11/2017 | Sipos ..................... G06F 11/079 |
| 2017/0366202 A1* | 12/2017 | Banerjee ................. G06F 12/14 |
| 2017/0371571 A1* | 12/2017 | Danilov ................... G06F 3/067 |
| 2018/0024746 A1* | 1/2018 | Jagadeesh ........... H03M 13/373 |
| | | 711/154 |

OTHER PUBLICATIONS

Coyne, Larry et al., "IBM Linear Tape File System Enterprise Edition V1.1.1.2: Installation and Configuration Guide", IBM Corporation, An IBM Redbooks publication, http://www.redbooks.ibm.com/abstracts/sg248143.html?Open, Abstract only, Jan. 29, 2015, 3 pages.

Rouse, Margaret, "What is erasure coding?", TechTarget, SearchStorage, http://searchstorage.techtarget.com/definition/erasure-coding, Nov. 2014, 5 pages.

Warren, Justin, "Why NetApp Snapshots Are Awesome", eigenmagic, https://www.eigenmagic.com/2009/10/17/why-netapp-snapshots-are-awesome/, Oct. 17, 2009, 10 pages.

\* cited by examiner

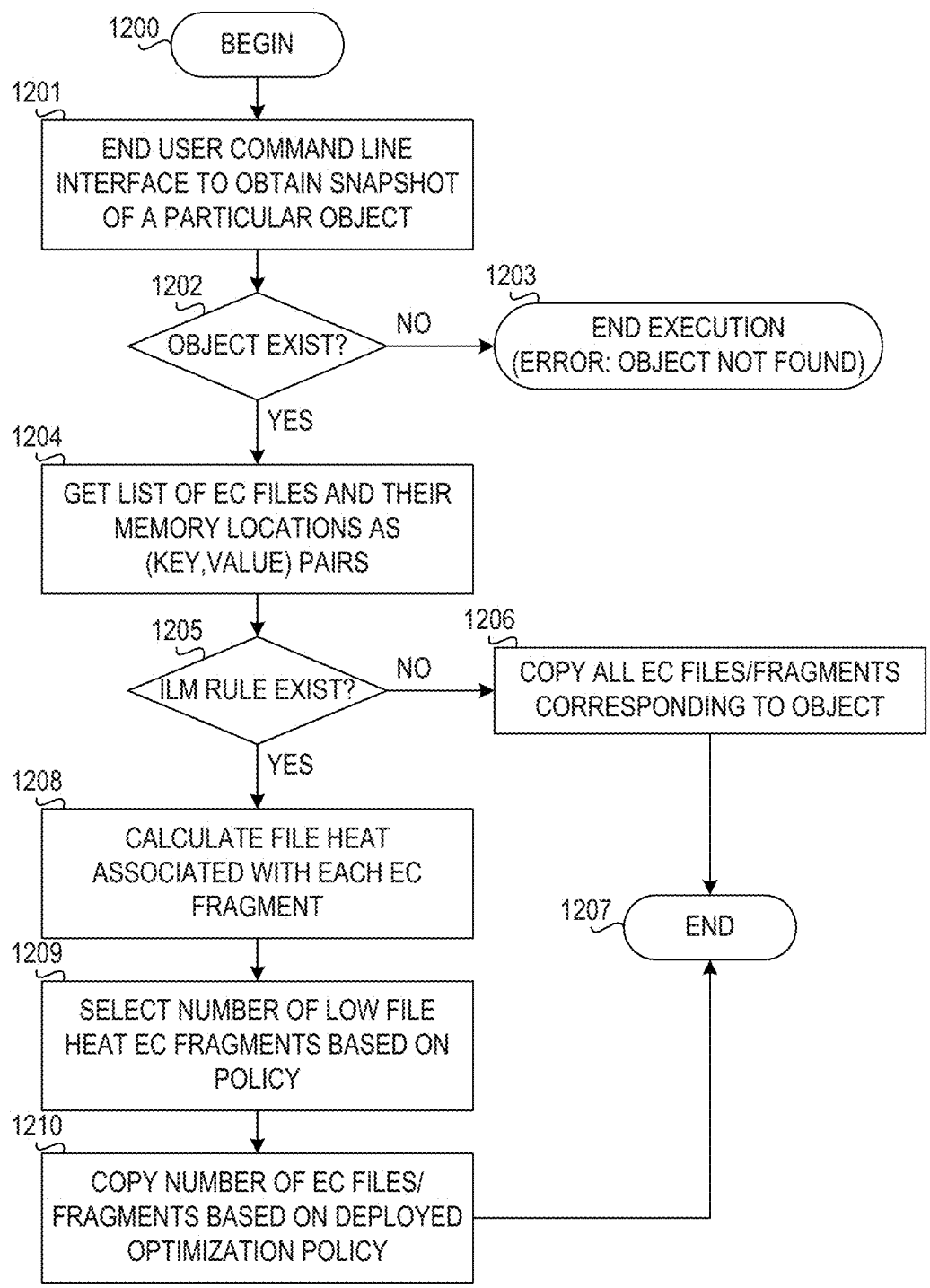

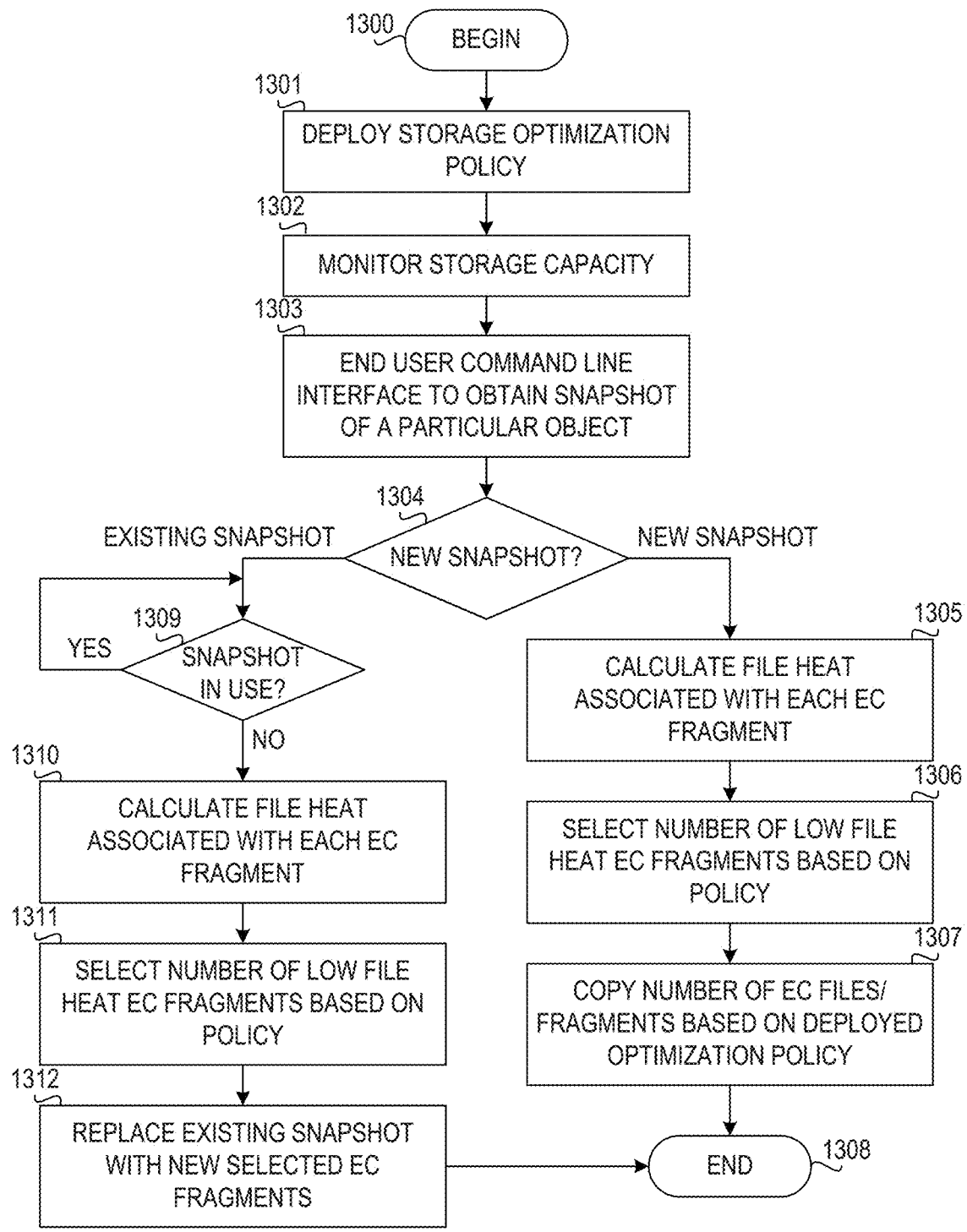

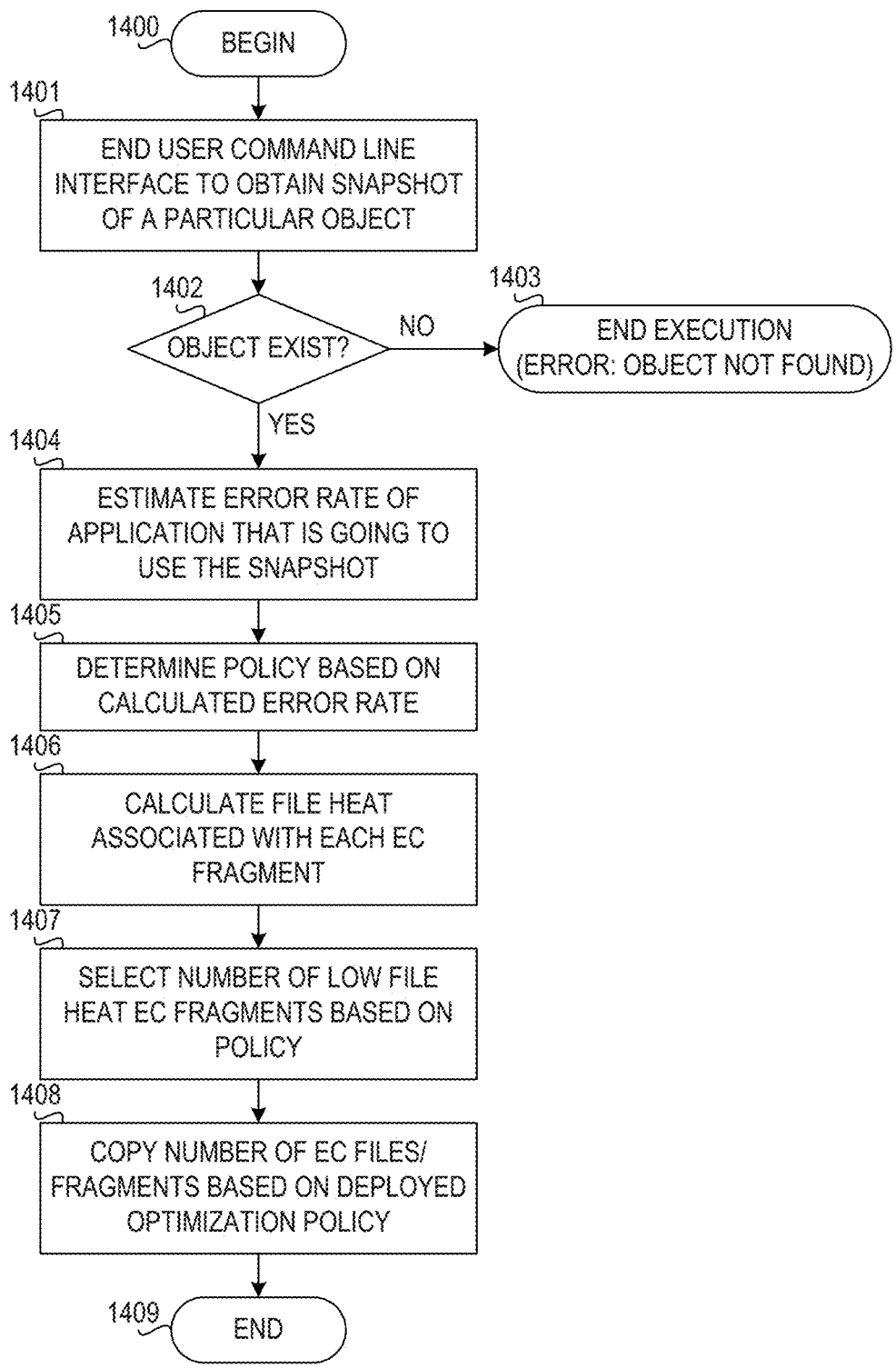

ENHANCED SNAPSHOT PERFORMANCE, STORAGE EFFICIENCY IMPROVEMENT, DYNAMIC SNAPSHOT POLICY IN ERASURE CODE SUPPORTED OBJECT STORAGE ENVIRONMENT

BACKGROUND

The present application relates generally to an improved data processing apparatus and method and more specifically to mechanisms for enhanced snapshot performance, storage efficiency improvement, dynamic snapshot policy in erasure coded supported object storage environment.

In computer systems, a snapshot is the state of a system at a particular point in time. A snapshot can refer to an actual copy of the state of a system or to a capability provided by certain systems. A full backup of a large data set may take a long time to complete. On multi-tasking or multi-user systems, there may be writes to that data while it is being backed up. This prevents the backup from being atomic and introduces a version skew that may result in data corruption. For example, if a user moves a file into a directory that has already been backed up, then that file would be completely missing on the backup media, since the backup operation had already taken place before the addition of the file. Version skew may also cause corruption with files which change their size or contents underfoot while being read.

One approach to safely backing up live data is to temporarily disable write access to data during the backup, either by stopping the accessing applications or by using the locking application programming interface (API) provided by the operating system to enforce exclusive read access. This is tolerable for low-availability systems, e.g., on desktop computers and small workgroup servers, on which regular downtime is acceptable. High-availability 24/7 systems, however, cannot bear service stoppages.

To avoid downtime, high-availability systems may instead perform the backup on a snapshot a read-only copy of the data set frozen at a point in time and allow applications to continue writing to their data. Most snapshot implementations are efficient such that the time and I/O needed to create the snapshot does not increase with the size of the data set. By contrast, the time and I/O required for a direct backup is proportional to the size of the data set. In some systems once the initial snapshot is taken of a data set, subsequent snapshots copy the changed data only, and use a system of pointers to reference the initial snapshot. This method of pointer-based snapshots consumes less disk capacity than if the data set was repeatedly cloned.

Erasure coding (EC) is a method of data protection in which data is broken into fragments, expanded and encoded with redundant data pieces and stored across a set of different locations or storage media. The goal of erasure coding is to enable data that becomes corrupted at some point in the disk storage process to be reconstructed by using information about the data that's stored elsewhere in the array. Erasure codes are often used instead of traditional redundant array of independent disks (RAID) because of their ability to reduce the time and overhead required to reconstruct data. The drawback of erasure coding is that it can be more processor-intensive, and that can translate into increased latency. Erasure coding can be useful with large quantities of data and any applications or systems that need to tolerate failures, such as disk array systems, data grids, distributed storage applications, object stores and archival storage. One common current use case for erasure coding is object-based cloud storage.

Erasure coding creates a mathematical function to describe a set of numbers so they can be checked for accuracy and recovered if one is lost. Referred to as polynomial interpolation or oversampling, this is the key concept behind erasure codes. In mathematical terms, the protection offered by erasure coding can be represented in simple form by the following equation: n=k+m. The variable "k" is the original amount of data or symbols. The variable "m" stands for the extra or redundant symbols that are added to provide protection from failures. The variable "n" is the total number of symbols created after the erasure coding process. For instance, in a 10 of 16 configuration, or EC 10/16, six extra symbols (in) would be added to the 10 base symbols (k). The 16 data fragments (n) would be spread across 16 drives, nodes or geographic locations. The original the could be reconstructed from 10 verified fragments.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions which are executed by the at least one processor and configure the processor to implement a snapshot utility for generating a snapshot of an erasure coded object in an object storage environment. The method comprises responsive to receiving a request to generate a snapshot of an erasure coded (EC) object in a filesystem in the object storage environment, obtaining, by the snapshot utility, a list of EC fragments from a proxy layer of the object storage environment. The method further comprises copying, by the snapshot utility, a number of the EC fragments to generate the snapshot of the EC object.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 12 is a flowchart illustrating operation of a snapshot mechanism for generating a snapshot of an erasure coded object in accordance with an illustrative embodiment;

FIG. 13 is a flowchart illustrating operation of a snapshot mechanism with storage optimization policy implementation in accordance with an illustrative embodiment; and FIG. 14 is a flowchart illustrating operation of a snapshot mechanism for generating a snapshot of an erasure coded object with an application reliability based storage optimization policy in accordance with an illustrative embodiment.

DETAILED DESCRIPTION

Figure 1:
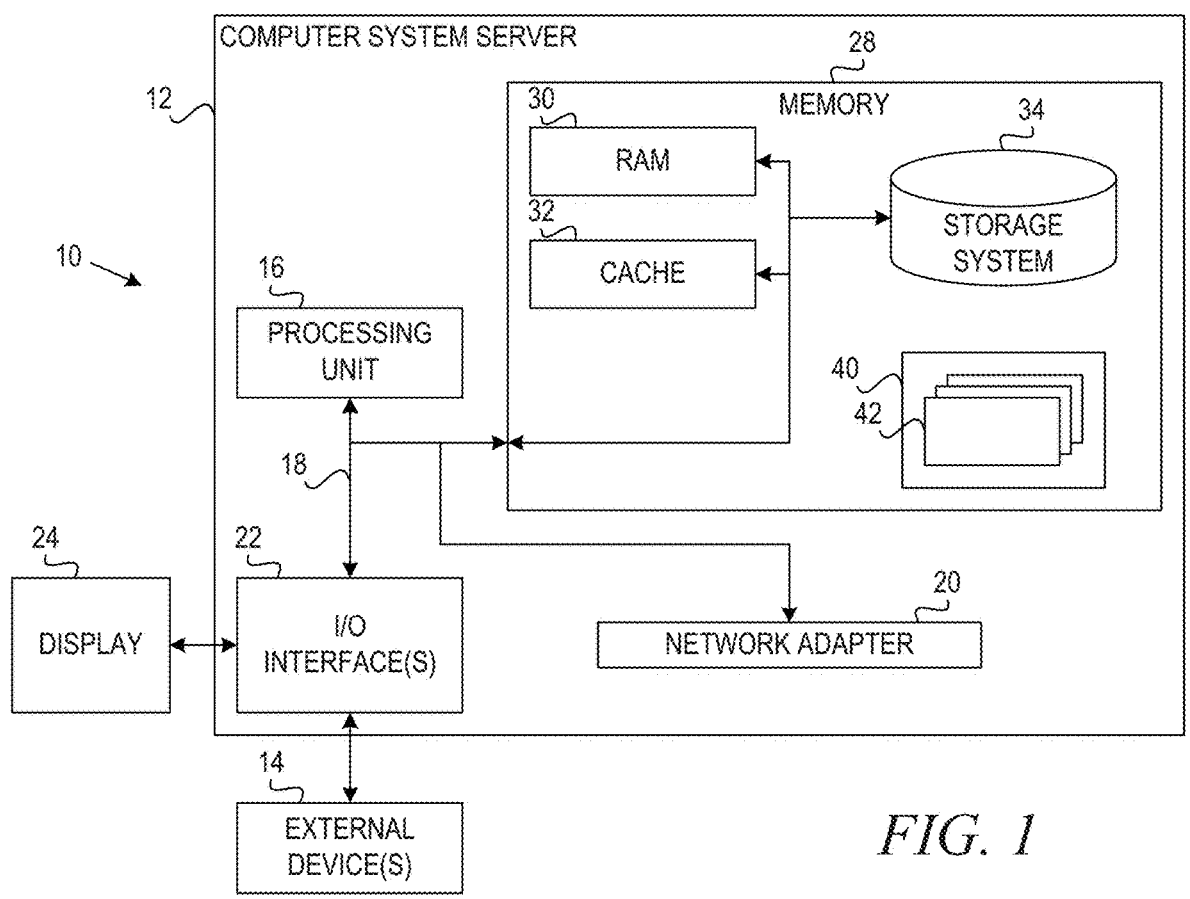
FIG. 1 depicts a cloud computing node according to an illustrative embodiment.

The illustrative embodiments provide mechanisms that can be integrated with a snapshot mechanism such that it helps in effective optimization of storage and efficiency in case of an erasure coded object storage environment built using a clustered file system. The mechanisms of the illustrative embodiments enable a provision for the end user to collect a single object snapshot, enable a provision to dynamically readjust the number of object error code (EC) fragments used for a snapshot based on the configured storage optimization rules, enables a provision to adaptively select object EC fragments to be used for a snapshot based on file heat, and provides application reliability awareness in deciding the number of object EC fragments used for a snapshot.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Object storage (also known as object-based storage) is a computer data storage architecture that manages data as objects, as opposed to other storage architectures like file systems which manage data as a file hierarchy and block storage which manages data as blocks within sectors and tracks. Each object typically includes the data itself, a variable amount of metadata, and a globally unique identifier. Object storage can be implemented at multiple levels, including the device level (object storage device), the system level, and the interface level. In each case, object storage seeks to enable capabilities not addressed by other storage architectures, like interfaces that can be directly programmable by the application, a namespace that can span multiple instances of physical hardware, and data management functions like data replication and data distribution at object-level granularity. Object storage is widely used in on-premises and public clouds.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media, Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data, Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
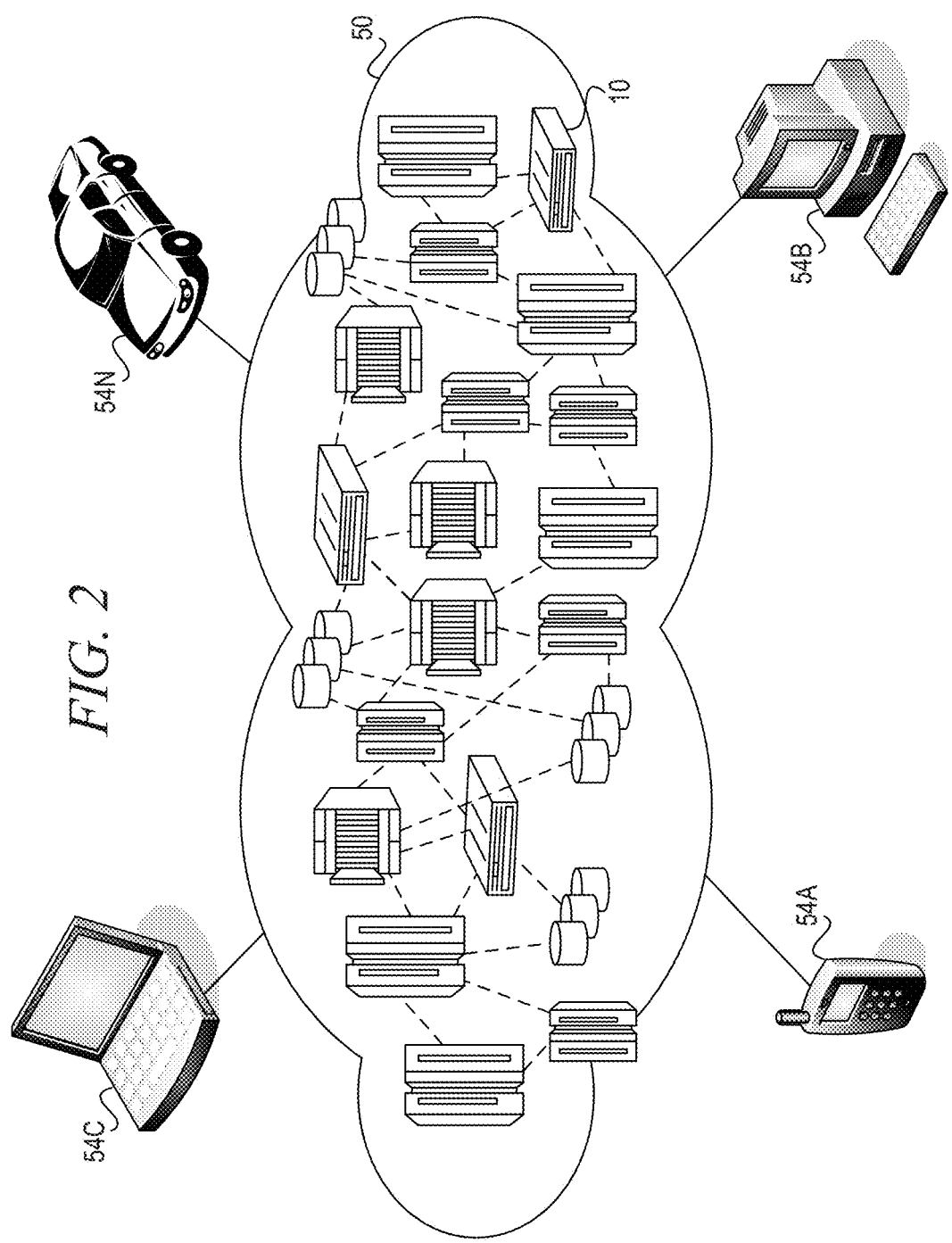
FIG. 2 depicts a cloud computing environment according an illustrative embodiment.
Figure 3:
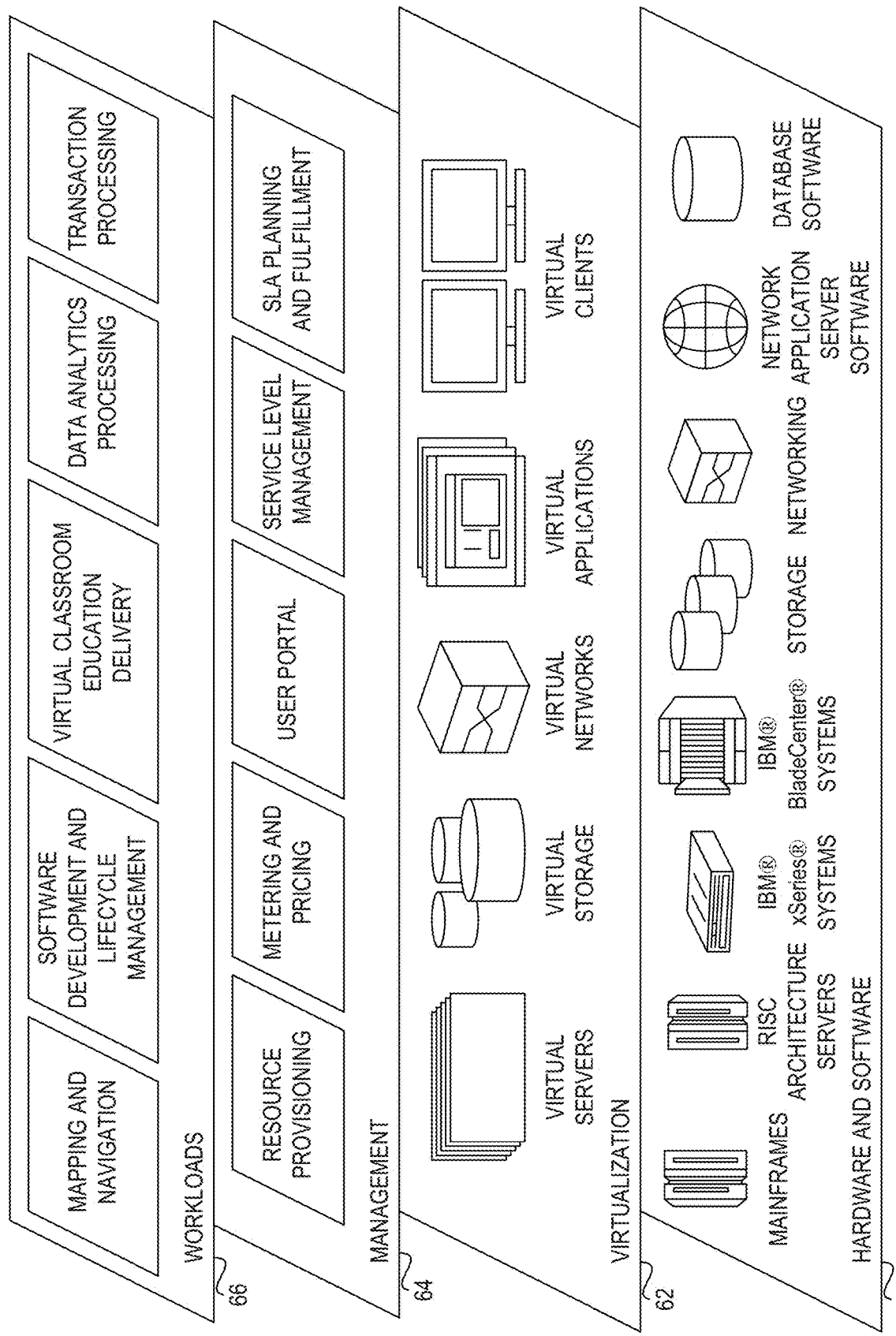
FIG. 3 depicts abstraction model layers according to an illustrative embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser), Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for Which a future requirement is anticipated in accordance with an SLA.

Workloads layer 66 provides examples of functionality for which the cloud computing environment may be utilized. Examples of workloads and functions which may be provided from this layer include: mapping and navigation;

software development and lifecycle management; virtual classroom education delivery; data analytics processing; and transaction processing.

Figure 4:
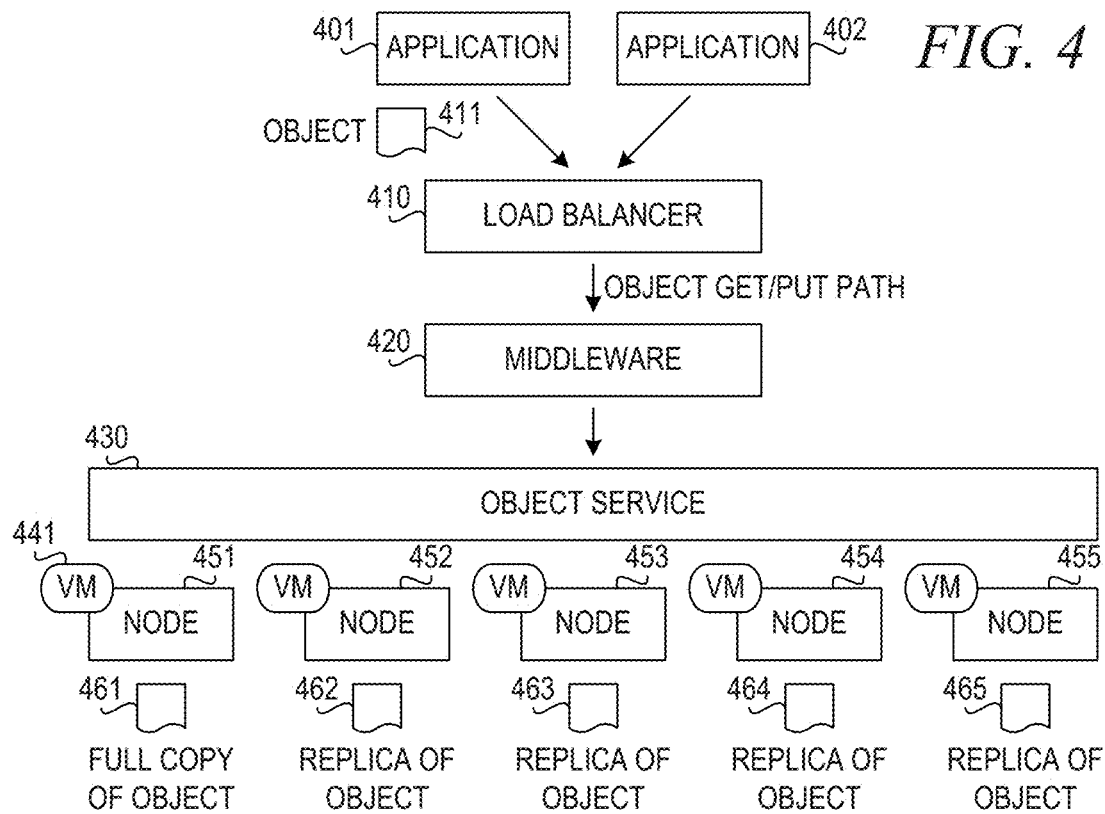
FIG. 4 is a block diagram illustrating a traditional object storage architecture.

FIG. 4 is a block diagram illustrating a traditional object storage architecture, which comprises two entities/node groups. One node group, referred to as "proxy nodes," is used for a distributed load handling/request handling nodes into the namespace. Another node group, referred to as "storage nodes," is responsible for writing to the disks/storage subsystems and this architecture purely serves as a storage unit/repository and for analysis (extracting meaningful information from raw data) of the data residing in these storage units, it would require an additional client or compute node.

Applicants 401, 402 send objects, such as object 411, to be stored to load balancer 410. Middleware 420 sends the object 411 to object service 430. In the depicted example, load balancer 410 and middleware 420 are the proxy nodes. Object service 420 stores objects written from applications 401, 402 to storage nodes 451-455. Each node 451-455 may execute a virtual machine (VM), such as VM 441. In the depicted example, node 451 stores full copy of the object 461, and nodes 452-455 store replicas of the object 462-465.

Figure 5:
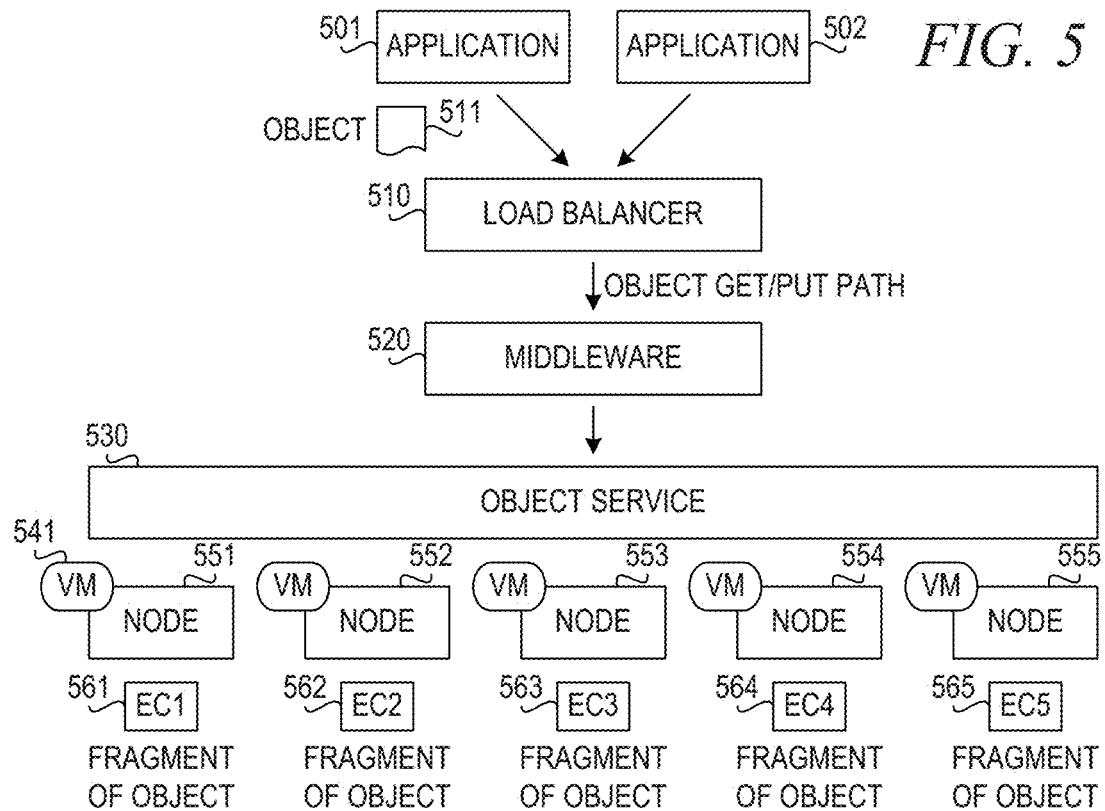
FIG. 5 is a block diagram illustrating an erasure code supported object storage architecture in which aspects of the illustrative embodiments may be implemented.

FIG. 5 is a block diagram illustrating an erasure code supported object storage architecture in which aspects of the illustrative embodiments may be implemented. Erasure coding is a method of data protection in which data is broken into fragments, expanded and encoded with redundant data pieces, and stored across a set of different locations or storage media. Applicants 501, 502 send objects, such as object 511, to be stored to load balancer 510. Middleware 520 sends the object 511 to object service 530. In the depicted example, load balancer 510 and middleware 520 are the proxy nodes.

In an erasure code supported object storage architecture, the received object to be stored is split into network chunks and each chunk is encoded with the erasure code (EC) schema. Each encoded chunk is referred as a fragment, and each fragment is stored on different locations per node. Thus, object service 520 stores objects written from applications 501, 502 to storage nodes 551-555. Each node 551-555 may execute a virtual machine (YM), such as VM 541. In the depicted example, nodes 551-555 store fragments of the object EC1-EC5 561-565.

A snapshot primarily creates a point-in-time copy of data. Typically, a snapshot copy is done instantly and made available for use by other applications, such as data protection, data analysis and reporting, and data replication applications.

IBM general parallel filesystem (GPFS) supports information lifecycle management (HAI) policies such that it is possible to monitor how frequently a file is accessed. A file's access temperature is an attribute for a policy that provides a means of optimizing tiered storage. File temperatures are a relative attribute, which indicates whether a file is "hotter" or "colder" than the others in its pool. The policy can be used to migrate hotter files to higher tiers and colder files to lower tiers. The access temperature is an exponential moving average of the accesses to the file. As files are accessed, the temperature increases; likewise, when the access stops, the file cools. File temperature is intended to optimize non-volatile storage, not memory usage. Therefore, cache hits are not counted. In a similar manner, only user accesses are counted.

Prior art algorithms used for implementing file snapshot involves collection of data bits that correspond to the file and creates a copy of them. This information can be retrieved from the filesystem layer. However, these prior art file snapshot algorithms prove inefficient in the case of erasure coded object storage architecture in which each object is split into a plurality of files, and each file contains a limited number of erasure coded bits. This number depends on the EC schema implemented. In this architecture, the relationship of a plurality of files corresponding to an object are not stored at the filesystem layer, and this relation can be calculated at the proxy layer, or erasure code controller level, which makes it difficult for traditional file snapshot algorithms when applied to obtain a snapshot of a single object.

The prior art algorithms lack dynamic readjustments in the number of object EC fragments used for a snapshot. Assume a traditional file snapshot algorithm is used for generating an object snapshot. In this scenario, the file snapshot algorithm creates a copy of all the files (EC fragments) corresponding to the object, whereas the file snapshot algorithm lacks intelligence to decide on a number of files (EC fragments) that must be copied to be sufficient to construct the original object. The traditional file snapshot algorithm also lacks intelligence to readjust the number of files (EC fragments) that has been already collected as part of snapshots in the past.

The prior art algorithms lack adaptive object EC fragment selection used for a snapshot based on file heat. In continuation of the above described scenario, where a traditional file snapshot algorithm is used for generating an object snapshot, the file snapshot algorithm lacks intelligence for selecting the least used files or EC fragments, among the group of files that correspond to the same object, for the snapshot based on file heat such that storage efficiency is improved.

Furthermore, prior art file snapshot algorithms lack application reliability awareness for deciding a number of object EC fragments to be used for a snapshot. In continuing with the above described scenario, traditional file snapshot algorithms lack intelligence to dynamically decide or readjust the number of EC fragments/files to be used for object snapshot depending on the application nature (e.g., reliability, I/O pattern, frequency of corruption, etc.).

The illustrative embodiments provide mechanisms that can be integrated with a snapshot mechanism such that it helps in effective optimization of storage and efficiency in case of an erasure coded object storage environment built using a clustered file system.

In accordance with one illustrative embodiment, the mechanism enables a provision tor the end user to collect a single object snapshot. In erasure coded object storage architecture, each object corresponds to multiple EC fragments (stored as files across various nodes) and the mechanism of the illustrative embodiment, responsive to a request for a snapshot of a particular object, determines the EC fragments/files, which are spread across different nodes in the cluster, that correspond to the object based on the configured EC schema. The mechanism collects the copy, performs a copy-on-write, and stores the changes using a special portion of disk as part of the snapshot operation.

in another illustrative embodiment, the mechanism enables a provision to dynamically readjust the number of object EC fragments used for a snapshot based on the configured storage optimization rules. Storage optimization rules are similar to information lifecycle management (ILM) policies. For example, an end user can execute a rule that automatically migrates least frequently accessed data to a lower storage tier if the usage capacity hits 70%. Similarly, the mechanism facilitates a new rule, integrated into the storage optimization rules or ILM policy, which can be applied to a filesystem on which an erasure coded object storage is built. As an example, a user can execute this rule such that responsive to the storage capacity reaching 70%, the number of EC fragments to be collected for a snapshot comes down from 11 to 10 (in a 9/11 scheme where any 9 fragments are sufficient to reconstruct the object), and responsive to the capacity reaching 80%, the number of EC fragments to be collected for a snapshot is decreased from 10 to 9. The proposed storage optimization rules apply only to snapshot data, whereas the original EC fragments have no effect in this case, even though snapshot fragments are 9, the original data still remain at 11 fragments). Based on the deployed storage optimization policy, the snapshot fragments are reduced dynamically depending on the configured EC schema. Apart from new snapshots, the mechanism of the illustrative embodiment also considers reduction of old (non-live) snapshot fragments.

In another illustrative embodiment, the mechanism enables a provision to adaptively select object EC fragments to be used for a snapshot based on file heat. In continuation with the above described embodiment, the mechanism of the illustrative embodiment enables a provision to automatically select EC fragments to be copied and used for a snapshot based on the relative file heat value, where the EC fragment maps to the block heat associated with that EC fragment. In an example embodiment, the mechanism chooses the EC fragments having relatively low file heat as compared to other EC fragments. This helps reduction of I/O latency, as it avoids snapshot load on EC fragments used by applications for serving the I/O.

In yet another illustrative embodiment, the mechanism uses application reliability awareness in deciding the number of object EC fragments used for a snapshot. The mechanism comprises a learning engine, which understands the application behavior along with its data corruption rate. Based on the identified application behavior, the mechanism helps determine a number of EC fragments to be automatically selected for a snapshot based on the EC schema. For example, consider two applications deployed to use the same erasure coded object storage built on a clustered filesystem: application 1 stores user data and application 2 performs backup to other low tiers. In this environment, the mechanism of the illustrative embodiment identifies the difference in application behavior along with each application's corruption rate. Based on the identification, if a snapshot is generated for usage by application 1, the learning engine tunes the storage optimization rules such that the snapshot mechanism chooses 10 fragments (out of 11) for the snapshot, whereas if the snapshot is generated for usage by application 2, the learning engine tunes the storage optimization rules such that the snapshot mechanism chooses 11 fragments (out of 11) for the snapshot in a 9/11 EC schema.

Figure 6:
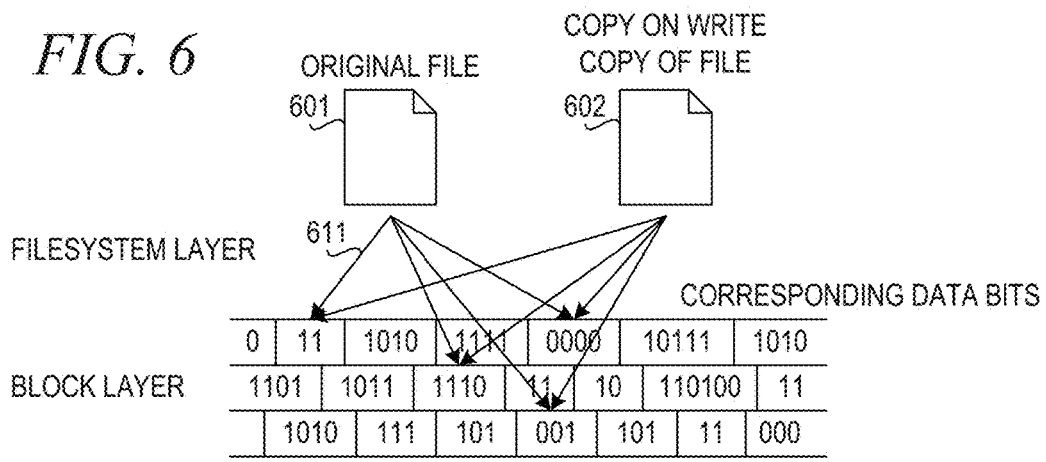
FIG. 6 depicts a traditional file snapshot mechanism that copies or creates pointers to data blocks corresponding to a single file.

FIG. 6 depicts a traditional file snapshot mechanism that copies or creates pointers to data blocks corresponding to a single file. Original file 601 comprises data blocks stored in the block layer. The filesystem layer references the data blocks of original file 601 using pointers 611. The traditional file snapshot mechanism creates a copy 602 of the original file 601 by copying the pointers 611 in the filesystem layer. This is a traditional snapshot mechanism that is widely used in clustered filesystems.

Figure 7:
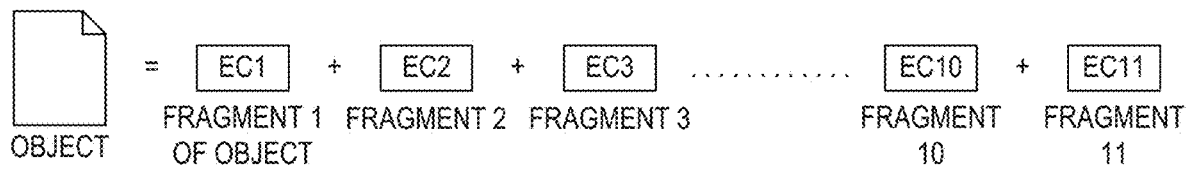
FIG. 7 depicts an erasure coded object layout to which aspects of the illustrative embodiments may be applied.

FIG. 7 depicts an erasure coded object layout to which aspects of the illustrative embodiments may be applied. The object is made up of a plurality of erasure code (EC) fragments. The example depicted in FIG. 7 is a 9/11 EC schema, meaning 9 EC fragments out of 11 total EC fragments are needed to recreate the object. Thus, the object is divided into EC fragments EC1-EC11.

Figure 8:
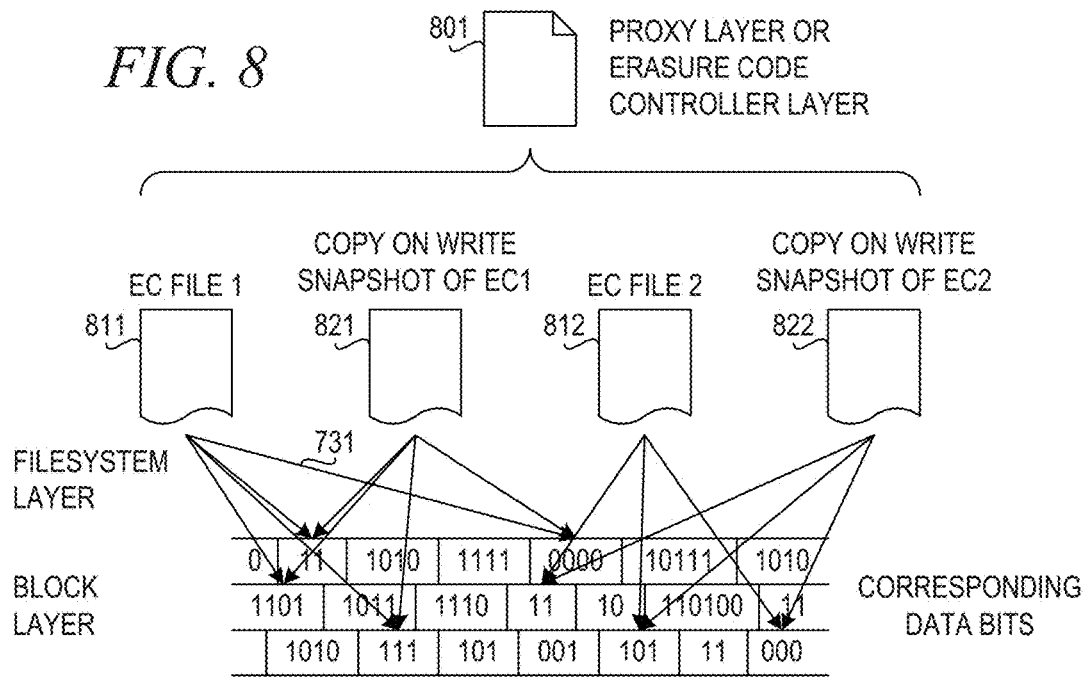
FIG. 8 depicts a problem encountered with a traditional file snapshot mechanism when used for generating a snapshot of an erasure coded object.

FIG. 8 depicts a problem encountered with a traditional file snapshot mechanism when used for generating a snapshot of an erasure coded object. In the proxy layer, or erasure code controller layer, object 801 is divided into a plurality of erasure code (EC) fragments EC1 811 and EC2 812. The traditional file snapshot mechanism cannot be used to obtain a snapshot for a single EC object due to each object being stored as multiple EC files and the relation between these multiple EC files and the object not being known to the filesystem layer. Also, using existing filesystem algorithms, the user can only take a snapshot of an individual EC fragment, such as the copy-on-write snapshot of EC1 821 or the copy-on-write snapshot of EC2 822.

Figure 9:
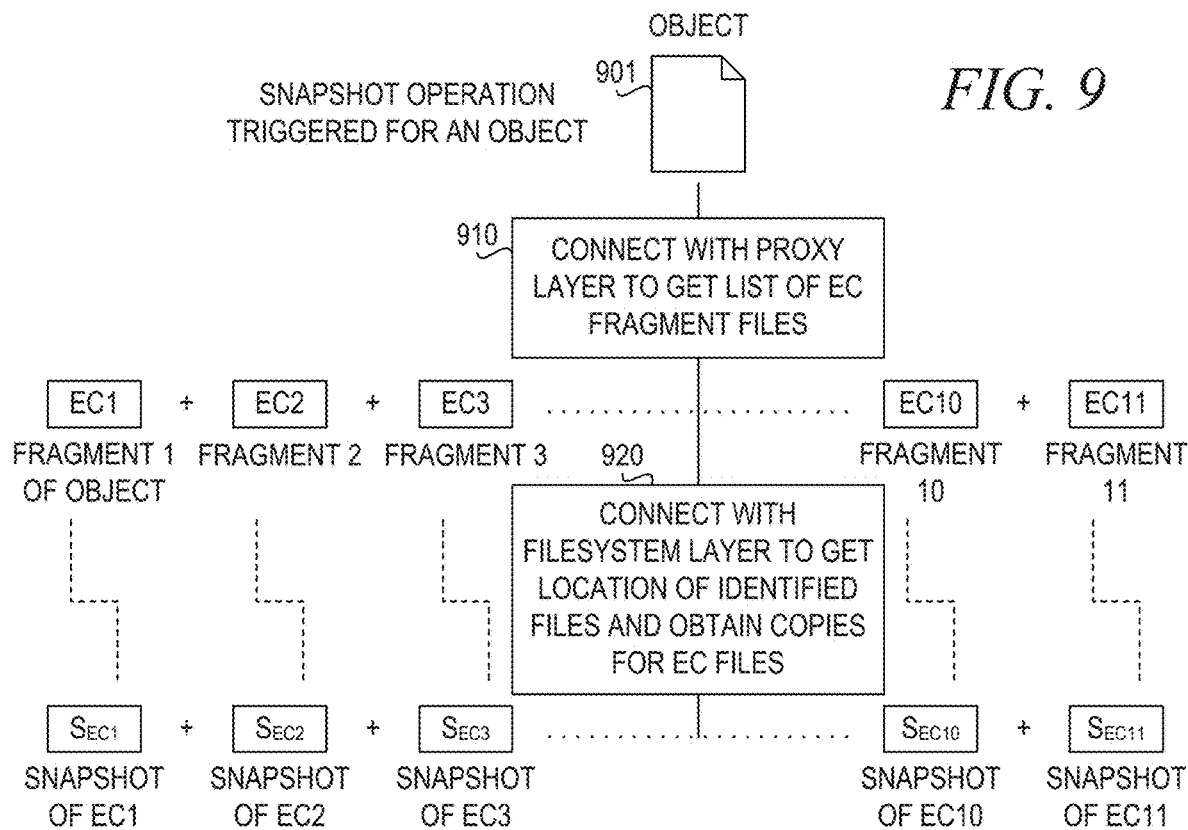
FIG. 9 illustrates a snapshot mechanism that enables an end user to generate a snapshot tor a single erasure coded object in accordance with an illustrative embodiment.

FIG. 9 illustrates a snapshot mechanism that enables an end user to generate a snapshot for a single erasure coded object in accordance with an illustrative embodiment. When a snapshot operation is triggered for an erasure coded object 901, the snapshot mechanism connects with the proxy layer to get a list of the EC fragment files EC1-EC11 (block 910). The snapshot mechanism then connects with the filesystem layer to get a location of identified files and generate copies for the EC fragment files (block 920). The resulting copies are $S_{EC1}$-$S_{EC11}$, which make up the snapshot of the EC object 901.

Figure 10A:
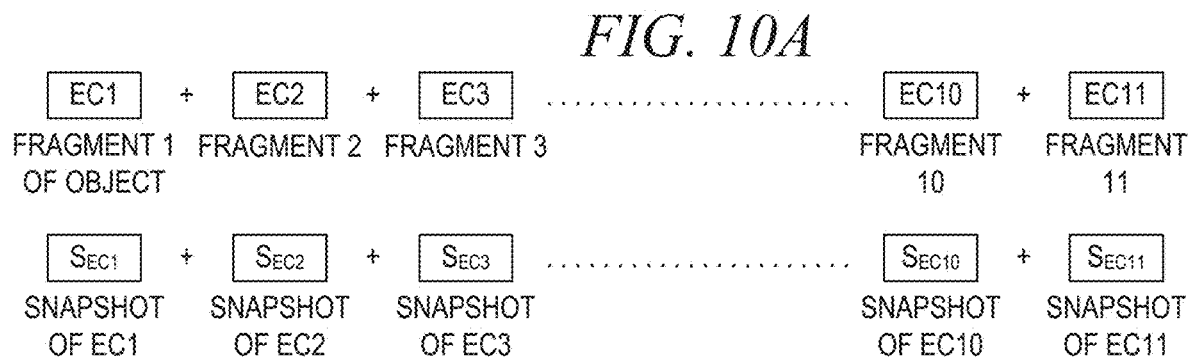
FIGS. 10A-10C illustrate proposed storage optimization rules for three example scenarios in accordance with an illustrative embodiment.
Figure 10B:
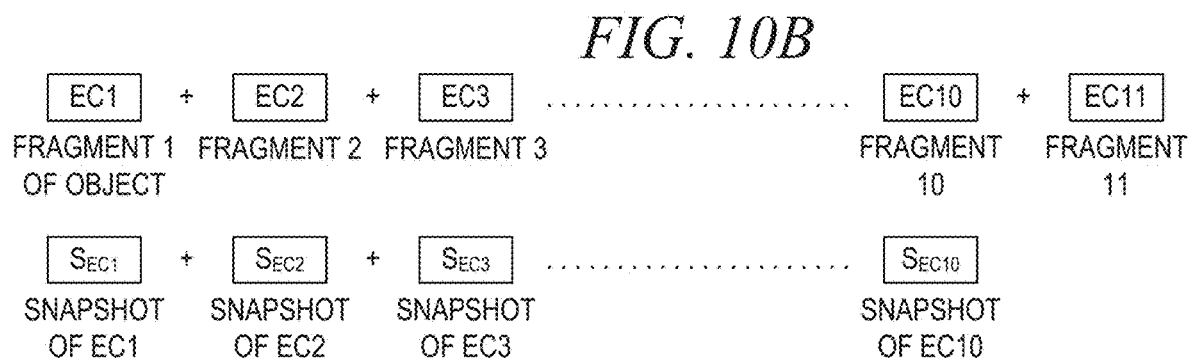
Figure 10C:
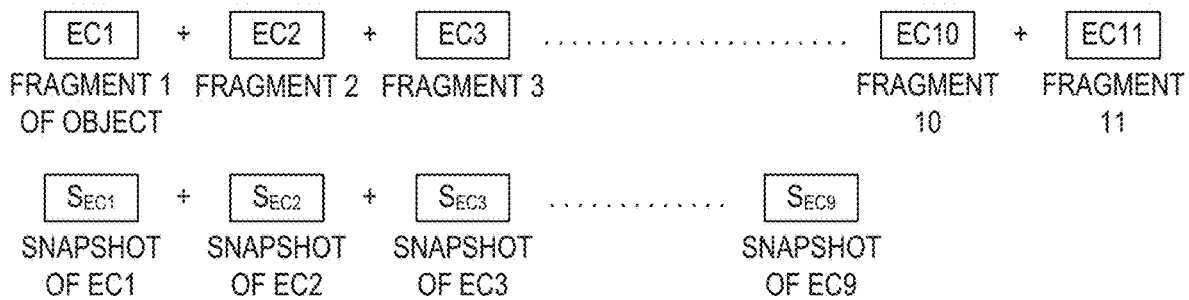

FIGS. 10A-10C illustrate proposed storage optimization rules for three example scenarios in accordance with an illustrative embodiment. In FIG. 10A, initial conditions are that the used storage capacity is less than a first threshold, $t_0$. Here, in a 9/11 EC schema, all 11 fragments are selected for the snapshot. Thus, an EC object comprising EC fragments EC1-EC11 will result in a snapshot comprising $S_{EC1}$-$S_{EC11}$.

Turning to FIG. 10B, the condition is that used storage capacity is greater than the first threshold, $t_0$, and less than a second threshold, $t_1$. Here, in a 9/11 EC schema, only 10 EC fragments are selected for the snapshot. Thus, an EC object comprising EC fragments EC1-EC11 will result in a snapshot comprising $S_{EC1}$-$S_{EC10}$.

With reference to FIG. 10C, the condition is that used storage capacity is greater than the first and second thresholds, $t_0$ and $t_1$, and less than a third threshold, $t_2$. Here, in a 9/11 EC schema, only 9 EC fragments are selected for the snapshot. Thus, an EC object comprising EC fragments EC1-EC11 will result in a snapshot comprising $S_{EC1}$-$S_{EC9}$.

Figure 11:
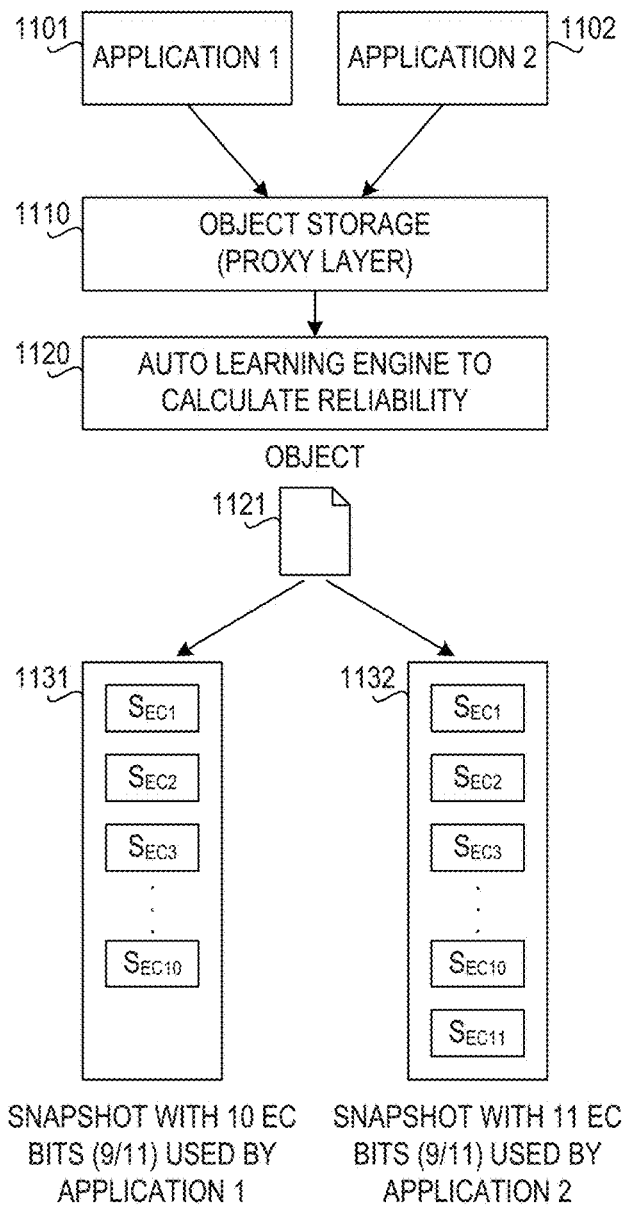
FIG. 11 is a block diagram illustrating snapshot storage optimization policies based on application reliability in accordance with an illustrative embodiment.

FIG. 11 is a block diagram illustrating snapshot storage optimization policies based on application reliability in accordance with an illustrative embodiment. Application 1 1101 and application 2 1102 communicate with object storage (proxy layer) 1110 to use an EC object storage architecture. In the depicted example, application 1 1101 and application 2 1102 have different application reliabilities, e.g., data error corruption rates.

Automatic learning engine 1120 calculates reliability values for application 1 1101 and application 2 1102, Learning engine 1120 automatically determines the number of EC fragments to be used for each respective snapshot and varies this value based on the application behavior, Here the learning algorithm can be based on statistical techniques, where it monitors and counts the number of corruptions fixed by the file system that happened within the blocks accessed per application. Then, the learning algorithm does a relative comparison of corruptions caused by other applications and likewise calculates the score. Other parts of the learning algorithm interact with the application's APIs and understand the kind of application (e.g., backup, search and query, etc.) as well as analyze the statistical read/write pattern per application and likewise determine if the application is read-intensive or write-intensive. Based on the application type, workload type, and the score, the algorithm determines the application reliability.

An example could be, if the application type is search, query type, it is read-intensive and the corruption score is tow. This application will be marked as a highly reliable application. On the other end, there can be an application that is write-intensive and then corruption will be high. This application will be marked as a tow reliability application.

In the depicted example, application 1 1101 may store user data and application 2 1102 may perform a backup to other low tiers. Application 1 1101 and application 2 1102 may be deployed to use the same EC object storage architecture built on a clustered filesystem. In this environment, learning engine 1120 identifies the difference in application behavior, along with data corruption rate. Based on the identification. When generating a snapshot for application 1 1101, learning engine 1120 tunes the storage optimization rules such that, the snapshot mechanism chooses 10 fragments (out of 11 in a 9/11 EC schema) for the snapshot 1131 of object 1121. When generating a snapshot for application 2 1102, learning engine 1120 tunes the storage optimization rules such that the snapshot mechanism chooses 11 fragments (out of 11 in a 9/11 EC schema) for the snapshot 1132 of object 1121.

FIG. 12 is a flowchart illustrating operation of a snapshot mechanism for generating a snapshot of an erasure coded object in accordance with an illustrative embodiment. Operation begins (block 1200), and snapshot mechanism receives a request from an end user command line interface to generate a snapshot of a particular object (block 1201). The request could be from any interface capable of receiving a request for a snapshot of an EC object. An example of such a command is as follows: $\$_{snap\text{-}\ \text{-}copy\text{-}on\text{-}write<object\_name>}$.

The snapshot mechanism determines whether the object exists (block 1202). If the object does not exist, then the snapshot mechanism ends execution with an error indicating the object is not found (block 1203).

If the object does exist in block 1202, then the snapshot mechanism gets a list of EC files/fragments and their memory locations as (key, value) pairs (block 1204). An example of these (key, value) pairs is as follows:

(EC1: x00001298, EC2: x00002215, . . . , EC10: x00004916, EC11: x00089078

The snapshot mechanism then determines whether any information lifecycle management (ILK) rule exists (block 1205). If no ILM rule exists, then the snapshot mechanism copies all EC files/fragments corresponding to the object to generate the snapshot (block 1206). Thereafter, operation ends (block 1207).

If an ILM rule exists in block 1205, then the snapshot mechanism calculates a file heat associated with each EC fragment (block 1208). The mechanism then selects a number of EC fragments having relatively low file heat based on a policy (block 1209). The snapshot mechanism copies a number of EC files/fragments based on a deployed optimization policy (block 1210). Thereafter, operation ends (block 1207).

FIG. 13 is a flowchart illustrating operation of a snapshot mechanism with storage optimization policy implementation in accordance with an illustrative embodiment. Operation begins (block 1300), and the mechanism deploys a storage optimization policy (block 1301). An example of deploying a storage optimization policy is as follows:

RULE SNAPSHOT_OPTIMIZATION to 0% if value (capacity>threshold)$t_0$))

RULE SNAPSHOT_OPTIMIZATION to 90% if value (threshold($t_0$)<capacity<threshold($t_1$))

RULE SNAPSHOT_OPTIMIZATION to 80% if value (threshold($t_1$)<capacity<threshold($t_2$))

The snapshot mechanism monitors storage capacity (block 1302). The snapshot mechanism then receives a request from an end user command line interface to generate a snapshot of a particular object (block 1303). The request could be from any interface capable of receiving a request for a snapshot of an EC object.

The snapshot mechanism determines whether there is an existing snapshot for the object or the requested snapshot is a new snapshot for the object (block 1304). If the requested snapshot is a new snapshot, meaning there is not an existing snapshot, the snapshot mechanism calculates a file heat associated with each EC fragment (block 1305). The mechanism then selects a number of EC fragments having relatively low file heat based on a policy (block 1306). The snapshot mechanism copies a number of EC files/fragments based on a deployed optimization policy (block 1307). Thereafter, operation ends (block 1308).

If there is an existing snapshot in block 1304, then the snapshot mechanism determines whether the snapshot is in use (block 1309). If the snapshot is in use, then operation returns to block 1309 to wait until the snapshot is no longer in use. If the snapshot is no longer in use in block 1309, then the snapshot mechanism calculates a file heat associated with each EC fragment (block 1310). The mechanism then selects a number of EC fragments having relatively low file heat based on a policy (block 1311). The snapshot mechanism replaces the existing snapshot with copies of the new selected EC files/fragments (block 1312). Thereafter, operation ends (block 1308).

FIG. 14 is a flowchart illustrating operation of a snapshot mechanism for generating a snapshot of an erasure coded object with an application reliability based storage optimization policy in accordance with an illustrative embodiment. Operation begins (block 1400), and snapshot mechanism receives a request from an end user command line interface to generate a snapshot of a particular object (block 1401). The request could be from any interface capable of receiving a request for a snapshot of an EC object. An example of such a command is as follows: $\$_{snap\text{-}\ \text{-}copy\text{-}on\text{-}write<object\_name>}$.

The snapshot mechanism determines whether the object exists (block 1402). If the object does not exist, then the snapshot mechanism ends execution with an error indicating the object is not found (block 1403).

The snapshot mechanism then estimates an error rate or reliability value of the application that is going to use the snapshot (block 1404). This calculation may be based on the criticality of the application, which can be configured by the user, the number of snapshot restores used by the application, or the like. The snapshot mechanism determines a policy based on the calculated error rate or reliability value (block 1405). Then, the snapshot mechanism calculates a file heat associated with each EC fragment (block 1406). The mechanism then selects a number of EC fragments having relatively low file heat based on a policy (block 1407). The snapshot mechanism copies a number of EC files/fragments based on a deployed optimization policy (block 1408). Thereafter, operation ends (block 1409).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the tatter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions which are executed by the at least one processor and configure the processor to implement a snapshot utility for generating a snapshot of an erasure coded object in an object storage environment, the method comprising:
responsive to receiving a request to generate a snapshot of an erasure coded (EC) object in a filesystem in the object storage environment, obtaining, by the snapshot utility, a list of EC fragments from a proxy layer of the object storage environment, wherein the list of EC fragments comprises a first number of EC fragments for the EC object, defined by an EC schema associated with the EC object;
determining, by the snapshot utility, a second number representing a number of EC fragments to include in the snapshot based on a policy and the EC schema associated with the EC object, wherein the second number is less than or equal to the first number;
selecting, by the snapshot utility, a subset of the list of EC fragments comprises a number of EC fragments equal to the second number, and
copying, by the snapshot utility, the selected subset of the list of EC fragments to generate the snapshot of the EC object.

2. The method of claim 1, wherein obtaining the list of EC fragments comprises obtaining the list of EC fragments as (key, value) pairs.

3. The method of claim 1, further comprising: determining a file heat value associated with each of the EC fragments; and selecting the subset of EC fragments based on file heat value.

4. The method of claim 3, wherein selecting the subset of EC fragments comprises selecting the subset of EC fragments having low file heat values relative to others of the EC fragments.

5. The method of claim 1, further comprising monitoring storage capacity of the filesystem and determining the second number based on a storage optimization policy and the storage capacity of the filesystem.

6. The method of claim 5, wherein determining the second number representing the number of EC fragments to include in the snapshot based on the storage optimization policy comprises: setting the second number equal to the first number responsive to the storage capacity of the filesystem being greater than a first threshold.

7. The method of claim 6, wherein determining the second number further comprises setting the second number to a first value less than the first number responsive to the storage capacity of the filesystem being less than the first threshold and greater than a second threshold, wherein the first value is sufficient to recreate the EC object.

8. The method of claim 7, wherein determining the second number comprises setting the second number to a second value less than the first number responsive to the storage capacity of the filesystem being less than the second threshold, wherein the second value is less than the first value and wherein the second value is sufficient to recreate the EC object.

9. The method of claim 1, further comprising: responsive to determining there is an existing snapshot of the EC object, replacing the existing snapshot with the generated snapshot of the EC object.

10. The method of claim 1, further comprising: determining an application reliability value for an application that is to use the snapshot; and
determining the second number of EC fragments to include in the snapshot based on the application liability value.

11. A computer program product comprising a non-transitory computer readable storage medium having a computer readable program stored therein, wherein the computer readable program, When executed on a computing device, causes the computing device to implement a snapshot utility for generating a snapshot of an erasure coded object in an object storage environment, wherein the computer readable program causes the computing device to:
responsive to receiving a request to generate a snapshot of an erasure coded (EC) object in a filesystem in the object storage environment, obtain, by the snapshot utility, a list of EC fragments from a proxy layer of the object storage environment; wherein the list of EC fragments comprises a first number of EC fragments for the EC object, defined by an EC schema associated with the EC object;

determine, by the snapshot utility, a second number representing a number of EC fragments to include in the snapshot based on a policy and an EC schema associated with the EC object, wherein the second number is less than or equal to the first number;

select, by the snapshot utility, a subset of the list of EC fragment to include in the snapshot, wherein the subset of the list of EC fragments comprises a number of EC fragments equal to the second number; and copy, by the snapshot utility, the selected subset of the list of EC fragments to generate the snapshot of the EC object.

12. The computer program product of claim 11, wherein the computer readable program further causes the computing device to: determine a the heat value associated with each of the EC fragments; and select the subset of the list of EC fragments based on file heat value.

13. The computer program product of claim 12, wherein selecting the number of EC fragments comprises selecting the subset of EC fragments having low file heat values relative to others of the EC fragments.

14. The computer program product of claim 11, wherein the computer readable program further causes the computing device to monitor storage capacity of the filesystem and determine the second number based on a storage optimization policy and the storage capacity of the filesystem.

15. The computer program product of claim 14, wherein determining the second number of EC fragments to include in the snapshot based on the storage optimization policy comprises:

setting the second number equal to the first number responsive to the storage capacity of the filesystem being less than a first threshold;

setting the second number to a first value less than the first number responsive to the storage capacity of the filesystem being greater than the first threshold and less than a second threshold, wherein the first value is sufficient to recreate the EC object; and setting the second number to a second value less than the first number responsive to the storage capacity of the filesystem being greater than the second threshold, wherein the second value is less than the first value and wherein the second subset of EC fragments is sufficient to recreate the EC object.

16. The computer program product of claim 11, wherein the computer readable program further causes the computing device to: responsive to determining there is an existing snapshot of the EC object, replace the existing snapshot with the generated snapshot of the EC object.

17. The computer program product of claim 11, wherein the computer readable program further causes the computing device to: determine an application reliability value for an application that is to use the snapshot; and determine the second number of EC fragments to include in the snapshot based on the application reliability value.

18. An apparatus comprising: at least one processor; and a memory coupled to the at least one processor, wherein the memory comprises instructions which, when executed by the at least one processor, cause the at least one processor to implement a snapshot utility for generating a snapshot of an erasure coded object in an object storage environment, wherein the instructions cause the at least one processor to:

responsive to receiving a request to generate a snapshot of an erasure coded (EC) object in a filesystem in the object storage environment, obtain, by the snapshot utility, a list of EC fragments from a proxy layer of the object storage environment, wherein the list of EC fragments comprises a first number of EC fragments for the EC object, defined by an EC schema associated with the EC object;

determine, by the snapshot utility, a second number representing a number of EC fragments to include in the snapshot based on a policy and an EC schema associated with the EC object, wherein the second number is less than or equal to the first number;

select, by the snapshot utility, a subset of the list of EC fragment to include in the snapshot, wherein the subset of the list of EC fragments comprises a number of EC fragments equal to the second number; and copy, by the snapshot utility, the selected subset of the EC fragments to generate the snapshot of the EC object.

19. The apparatus of claim 18, wherein the instructions further cause the at least one processor to monitor storage capacity of the filesystem and determine the second number based on a storage optimization policy and the storage capacity of the filesystem.

20. The apparatus of claim 18, wherein the instructions further cause the at least one processor to: determine an application reliability value for an application that is to use the snapshot; and determine the second number of EC fragments to include in the snapshot based on the application reliability value.

* * * * *